July 6, 1943.  A. C. WILSON  2,323,583
METHOD OF AND MEANS FOR TREATING HYDROGELS
Filed July 15, 1939  2 Sheets-Sheet 2

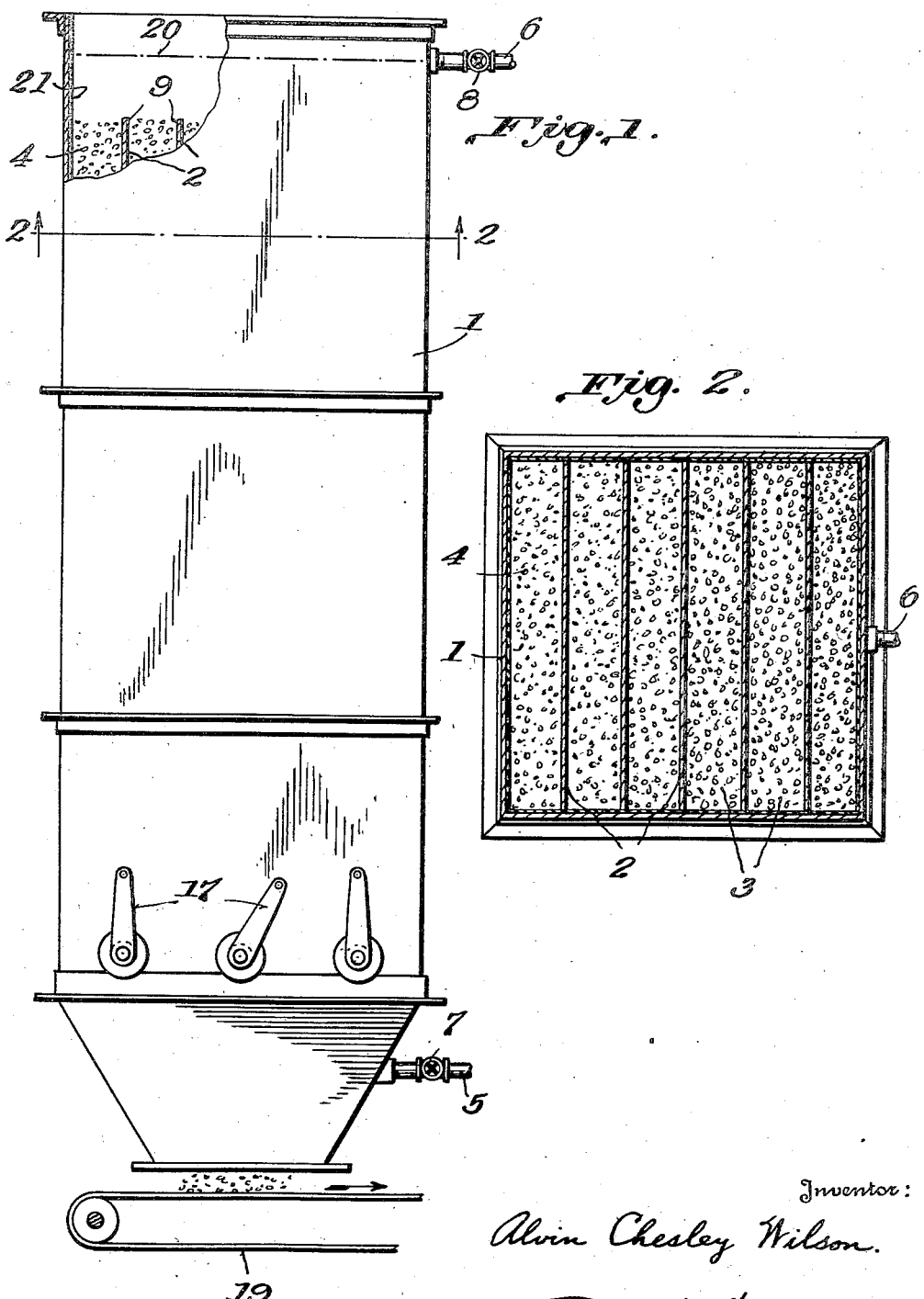

Inventor:
Alvin Chesley Wilson.
By Frank H. Wisch.
Attorney

Patented July 6, 1943

2,323,583

UNITED STATES PATENT OFFICE 2,323,583

METHOD OF AND MEANS FOR TREATING HYDROGELS

Alvin Chesley Wilson, Baltimore, Md., assignor to The Davison Chemical Corporation, Baltimore, Md., a corporation of Maryland Application July 15, 1939, Serial No. 284,785

3 Claims. (Cl. 23—31)

This invention relates to improved methods of and means for treating a hydrogel and more particularly to the washing or purifying of gels such as those obtained in the production of silica gel.

An important part of the processes of preparing such gels is that comprising the steps employed in washing a hydrogel. According to one method of preparing for instance a silica hydrogel, silicate and acid solutions are mixed in such proportions and concentrations as to give a "sol." The sol is permitted to stand for a period during which its viscosity gradually increases until the whole body of the sol hardens and sets or coagulates into a mass known as the "hydrogel." After the hydrogel has stood for a certain prescribed period it is washed with water to remove excess free acid reagent and any soluble by-product. In preparing the gel from sodium silicate for instance, the sodium salt of the acid reagent, and the excess free 'acid reagent are removed. If hydrochloric or sulphuric acids are used, sodium chloride or sodium sulphate respectively are formed and during washing are removed along with the corresponding acid. After the washing is completed, the hydrogel is dried or dehydrated in any suitable manner.

The control of the washing treatment is important in obtaining a product of proper density as well as a product that is permanently heat stable on repeated activation. Patent No. 1,900,859, dated March 7, 1933, describes methods of washing hydrogel whereby a gel product of any desired apparent density is obtained by controlling the temperature of the wash liquid. The final product may be a gel having wide or narrow pores or pores of an intermediate size depending upon at what temperature in the range of from about 90° F. to about 190° F. the wash liquid is maintained. A large proportion of the silica gel now sold for commercial purposes is gel which has been washed at 150° F. A certain proportion is gel which has been washed at 175° F.

It has heretofore been the practice to wash hydrogel by means of what is generally known as the tray method. In the latter method a hydrogel broken into lumps is placed in shallow trays provided with perforated bottoms. These trays are positioned horizontally on a rack and the loaded rack is placed in a washing tank. Water is circulated through the tank for a period of approximately thirty-six to forty-eight hours or until sodium sulphate from a sodium silicate-sulphuric acid reaction product is washed down to approximately 0.1% or less (based on a finished gel).

The tray method has been used because hydrogel is very weak structurally and there is a tendency for it to pack if placed in deep layers. The tray method is expensive in its operation and in maintenance and replacement of equipment.

Various attempts have been made to wash gels in bulk rather than in small batches as in the tray method. These attempts have been heretofore universally unsuccessful. Washing the gel in one deep bed or layer is impractical because packing of the gel takes place and this prevents even distribution of washing fluid due to variations in the resistance to the flow of the washing fluids. The only part of the gel that is sufficiently washed in a deep bed is the gel in the uppermost zone of such a bed or layer. The gel in the lower zones thereof is left in an entirely unsatisfactory state. The velocity of flow of the wash water through gel is generally required to be extremely slow as for instance about one gallon per minute per square foot, or a vertical velocity of about one and one-half inches per minute or 0.025 inch per second. At this velocity the water is far below the critical point of turbulent flow. Although the wash water is recirculated and the velocity of flow is increased, the washing of the gel is not improved sufficiently by these factors alone. Furthermore with increased rate of flow a considerable proportion of gel is lost due to the reversion thereof to the sol state.

An object of the present invention is to provide a method and means whereby solids or semi-solids particularly of the type known as hydrogel can be economically and efficiently treated to remove impurities therefrom. A further object is to provide a method of and means for washing hydrogel to purify it in bulk without undue reversion and loss of material, and to thereby provide a uniform product.

The method and means provided in the present invention will be described hereinbelow by reference to the accompanying drawings in which:

Figure 1 is a side elevation, partly in section, of a container employed in washing hydrogel;

Fig. 2 is a horizontal sectional view on line 2—2 of Fig. 1 in the direction of the arrows;

Figure 3:
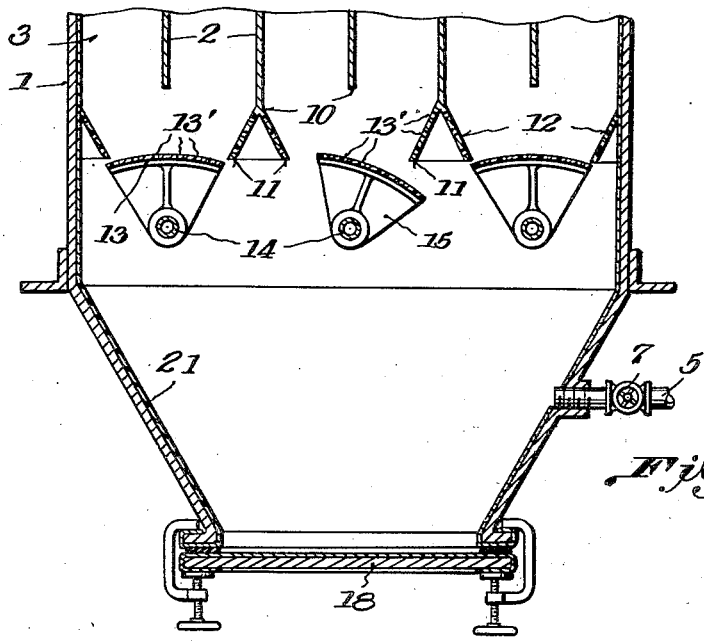
Fig. 3 is a vertical section of the lower end of a container such as that shown in Fig. 1.

Referring to the drawings, a tank or container 1 of substantial depth is provided with partitions 2 that extend from a level adjacent the bottom of the container 1 to a level adjacent the top thereof. The partitions form side walls for compartments 3 and are a relatively short distance apart so that when a hydrogel 4 fills the compartments to a depth substantially greater than the distance between the partitions, no packing of the hydrogel takes place in the compartments. The position of the walls tends to reduce the effect of the weight of the hydrogel in the upper zones of a compartment on the hydrogel in the lower zones. Practically the entire weight of the gel is supported or absorbed by the side walls of a compartment 3. The very bottom of a compartment supports a weight corresponding to a layer of hydrogel of only a few inches in height.

The side walls of a compartment 3 formed by partitions 2 are preferably upright or vertical and substantially parallel to each other. The tank 1 may be provided with any number of partitions 2 thereby making it possible to arrange a hydrogel in any number of relatively thin, upright or vertical layers as illustrated in Figs. 1 and 2.

A pipe 5 is connected to the tank 1 below the lower ends of the compartments 3. A pipe 6 is connected to the tank 1 at a level above the upper ends of the compartments. Either pipe 5 or 6 may be used for the introduction or withdrawal of washing fluid. If one is used as an inlet the other may be used as an outlet. Each of the compartments 3 is accessible at either end to washing fluid in either of the pipes 5 and 6. The pipes 5 and 6 may be provided with valves 7 and 8 respectively. The upper ends 9 of the partitions 2 are preferably positioned below the pipe 6.

The compartments 3 are preferably provided with bottoms that are removable so that hydrogel is readily removable by gravity from a lower edge of a layer of hydrogel, either continuously or intermittently. One arrangement of such bottoms is illustrated in Figs. 3 and 4.

The lower ends 10 of the partitions 2 extend downwardly to a level above the bottom of the tank 1 and above the pipe 5. One movable bottom may be provided for each pair of adjacent compartments 3. With six compartments, as shown, the outer side walls of each pair of compartments are extended downwardly and converge. Thus the lower edges 11 of the converging extensions 12 provide seating means for the movable bottoms 13. The extensions 12 and the movable bottoms 13 have perforations 13' that permit the retention of hydrogel in the compartments and permit the passage of washing fluid therethrough.

A movable bottom 13 comprises an elongated plate that presents a cylindrical surface toward the compartments and is rotatable, on substantially its axis, about a shaft 14. The movable bottoms 13 are supported on the shafts 14 by means of supports 15. Each shaft 14 extends through a stuffing box 16 affixed to a side of the tank 1. The projecting end of a shaft 14 is provided with a handle 17.

Figure 4:
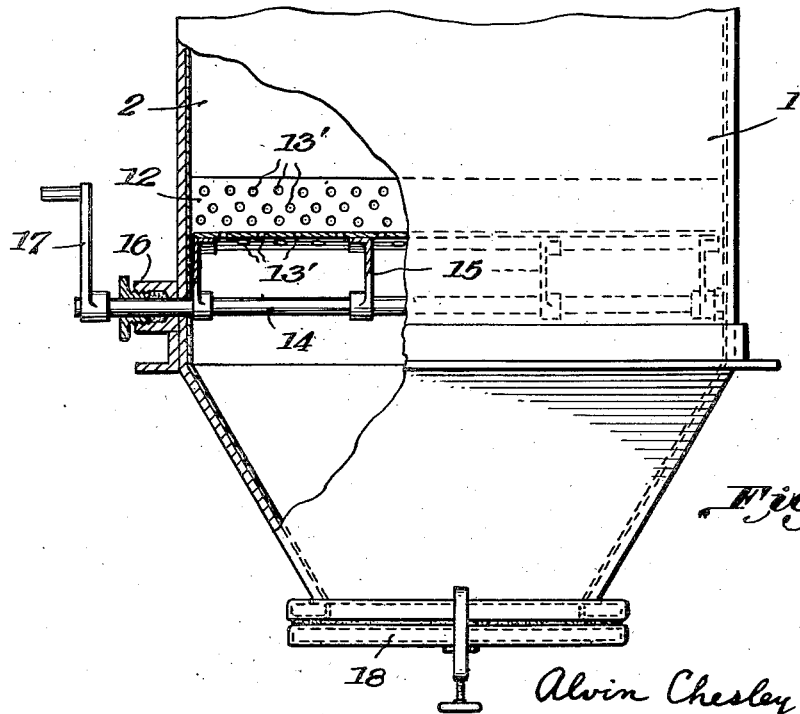
Fig. 4 is an elevational view, partly in section of the lower end of the container shown in Fig. 3 looking from the left thereof.

When a handle is in its uppermost position, the bottom 13 which it operates, is in its closed position as illustrated in the case of the bottoms for the outer compartments shown in Fig. 3. The bottom 13 for the two inner compartments is shown partly open. A movement of a handle 17 to the right or left of its uppermost position results in progressively moving a bottom 13 to the right or left to permit emptying of a compartment 3.

The tank 1 may be provided with a hopper bottom. An easily removable, water-tight cover plate 18 is provided for the tank bottom. Beneath the tank bottom is a means, such as a conveyor belt 19, for conveying washed material removed from the tank 1.

In the operation of the above-described apparatus for washing a hydrogel, the cover plate 18 is securely fastened to the bottom of the tank 1 and the compartment bottoms 13 are placed in closed position. The tank 1 is now ready to be charged. It has been found advantageous to fill the tank 1 first with water up to the level of the dotted line 20. A hydrogel which has been broken up as for instance by passing it through a coarse screen, is dumped into the compartments 3. The hydrogel to be washed in the course of a gel preparation process, is generally in the form of non-sticky, relatively fragile and more or less jelly-like masses. For washing purposes the hydrogel is generally in the stages before it is dried. Lumps of the hydrogel in such stages may under relatively slight compression be broken down to a moist powder or paste. The lumps of hydrogel may vary widely in size, and under certain conditions a batch of hydrogel will include lumps that are anywhere from substantially the size of a walnut or smaller up to about fist size.

By providing a distance of about two or three feet between the water level 20 and the tops 9 of the partitions 2, undue disintegration of the hydrogel is prevented and the pieces of hydrogel are absolutely evenly distributed in all compartments.

During the charging operation it is desirable to maintain the water level slightly below the pipe 6. This is done by withdrawing water through the pipe 5 at a rate equivalent to the rate of upward displacement of the water by the hydrogel passing into the tank. This procedure is desirable because, if during charging, the water overflows into the pipe 6, the water carries with it particles of hydrogel, whereby losses result.

Active washing of the hydrogel is now commenced. Water at the temperatures indicated above is introduced, for example, through the pipe 5. The washing liquid is passed upwardly and penetrates through the layers of hydrogel in the compartments 3 at a desired rate. The liquid carrying dissolved substances from the gel passes out of the tank 1 through the pipe 6. The water may be recirculated intermittently or continuously through the same tank or it may be conducted through a series of such tanks, and either in an upward direction or a downward direction.

After the desired period of washing, for example approximately 48 hours, the water is permitted to drain out of the tank 1. The cover plate 18 is removed. The washed gel is dumped from the compartments 3 by selectively moving the perforated bottoms 13 toward one side or the other or alternately toward one side and the other by means of the handles 17. The gel drops onto the belt 19 which carries the gel away. In loading the belt, the bottoms 13 serve as shut-off gates for preventing flooding and to obtain a satisfactory rate of discharge.

After the compartments 3 have been emptied they are again charged with further batches of hydrogel to be washed in the manner described.

The tank 1 and the various parts that are exposed to the wash liquid are preferably constructed of corrosion resistant material. A lining 21 of lead or rubber is found satisfactory.

As indicated above, an important feature of the present invention is the use of a narrow compartment in which a hydrogel is washed. A satisfactory width for a compartment about ten feet high has been found to be, for example, about eight inches. The angle of repose of hydrogel is such that the total pressure on the bottoms 13 is considerably reduced. Due to the relatively small downward pressure on the gel at any given level in a compartment, there is no packing and therefore the hydrogel is penetrable at all points between the walls of a compartment. Substantially uniform spacing of gel particles is maintained during the washing process and the particles offer no substantial increase in resistance to flow of the washing fluid in a lower level above that in an upper level. Thus the production of a uniform product in bulk washing of hydrogel is made possible.

No particular range of thickness of the hydrogel layer, or, in other words, no particular range of distances between the partitions 2, can be definitely stated as producing the desired effect. This depends on numerous factors and is best determined by actual test.

In the commercial application of the process and apparatus claimed, there is a considerable saving in operating costs, labor costs, installation, replacement and maintenance costs. The customary tray handling is entirely eliminated. Wood splinters from trays are a source of considerable annoyance since they often cause discoloration of activated gel. Besides saving in plant space, the above bulk washing means makes it possible to handle at least twice as much gel as a tray washing means occupying the same space.

What is claimed is:

1. In apparatus for washing hydrogel, a tank having a plurality of upright partitions therein spaced a relatively short distance apart to provide a plurality of relatively narrow spaces for the deposit of hydrogel therein and thereby preventing packing of the hydrogel during washing thereof, the said spaces being readily accessible to hydrogel to be charged into the tank, means connected to the tank for passing washing fluid into each of the said spaces, a movable plate extending across the bottom of each of the said spaces for retaining hydrogel therein during a washing operation, and means for moving the said plate progressively to one side or the other to permit the passage of washed hydrogel out of the said chamber.

2. A method of washing silica hydrogel, which comprises placing silica hydrogel in a substantially continuous vertical layer between upwardly extending substantially vertical walls, the said layer occupying the space between the said walls to a height many times greater than the thickness of the layer and the said walls being placed sufficiently close together to prevent packing of the hydrogel and so spaced that the weight of the hydrogel is substantially entirely supported by the opposed wall surfaces and that the weight of the hydrogel in the upper zones of the layer on the hydrogel in the lower zones is substantially reduced, and subjecting the hydrogel to the action of a washing fluid while said hydrogel is in the layer, thereby removing impurities from said hydrogel, and removing washed hydrogel from between the wall surfaces.

3. A method of washing silica hydrogel, which comprises placing silica hydrogel in a substantially continuous vertical layer between upwardly extending substantially vertical walls, the said layer occupying the space between the said walls to a height many times greater than the thickness of the layer and the said walls being of the order of eight inches apart and placed sufficiently close together to prevent packing of the hydrogel and so spaced that the weight of the hydrogel is substantially entirely supported by the opposed wall surfaces and that the weight of the hydrogel in the upper zones of the layer on the hydrogel in the lower zones is substantially reduced, and subjecting the hydrogel to the action of a washing fluid while said hydrogel is in the layer, thereby removing impurities from said hydrogel, and removing washed hydrogel from between the wall surfaces.

ALVIN CHESLEY WILSON.